United States Patent Office 2,958,707
Patented Nov. 1, 1960

2,958,707

DIORGANOPOLYSILOXANE-HALOGENATED OLEFIN GRAFT COPOLYMERS

Earl L. Warrick, Pittsburgh, Pa., assignor to Dow Corning Corporation, Midland, Mich., a corporation of Michigan No Drawing. Filed May 2, 1955, Ser. No. 505,561

2 Claims. (Cl. 260—448.2)

This application is a continuation-in-part of applicant's copending application Serial No. 422,993, filed April 13, 1954, now abandoned.

This invention relates to a novel method of reacting substituted olefinic compounds with organosilicon compounds and to the products obtained thereby. The terms "olefinic compound" or "olefin" as employed herein refer to a compound containing C=C linkage and in which the substituents contain at least 1 atom selected from the group consisting of oxygen, nitrogen and halogen atoms.

One of the problems which has long been unsolved in the organosilicon field is that of improving the lubricity and solvent resistance of organosilicon polymers. In the past, attempts to improve these properties have taken the course of preparing novel organosilanes containing halogenated hydrocarbon radicals. Such methods involve the preparation of expensive materials and have not to date lent themselves very well to the commercial production of modified organosilicon compounds. It would be highly desirable, therefore, to provide an inexpensive and efficient means of modifying commercially available organosilicon compounds whereby the lubricity and solvent resistance and other properties could be improved.

Prior to this invention it was known that olefinic compounds could be reacted with organosilicon compounds containing silicon bonded hydrogen, in the presence of peroxides to give new organosilicon derivatives. In this reaction addition of the olefin takes place on the silicon at the point where the hydrogen is attached. It was also known prior to this application that certain alkenyl substituted organosilicon compounds could be reacted with olefinic compounds whereby an addition of the olefin to the alkenyl radical on the silicon takes place thereby producing modification of the original organosilicon compound.

It is the object of this invention to provide a practical method for modifying organosilicon compounds in order to give improved lubricity, improved solvent resistance, increased thermostability and lower freezing points to commercially available organosilicon compounds such as methylsiloxanes. Another object is to make available organosilicon surface active agents. Another object is to prepare polymeric materials which are useful in the preparation of improved organosilicon rubbers. Other objects and advantages will be apparent from the following description.

In accordance with this invention a mixture of (1) an organosilicon compound having at least one alkyl radical of less than 5 carbon atoms, per molecule, which organosilicon compound is essentially free of silicon bonded hydrogen and essentially free of organic radicals having aliphatic unsaturation therein, (2) a substituted olefinic compound wherein the substituents contain an atom selected from the group consisting of oxygen, nitrogen and halogen atoms and (3) a free radical generator of the group organic peroxides and azo compounds in which both N atoms of the azo linkage are attached to a tertiary carbon atom and the remaining valences of said tertiary carbon atoms are satisfied by radicals of the group nitrile radicals, carboxyalkyl radicals, cycloalkylene radicals, alkyl radicals and radicals of the formula YOOC— in which Y is an alkyl radical, is heated at a temperature above that at which the free radical generator forms free radicals in contact with the organosilicon compound and the olefinic compound.

When the above conditions are adhered to an addition of the olefinic compound to the alkyl radicals of the organosilicon compound takes place, such addition is hereinafter referred to as grafting. The mechanism of this reaction is presumed to be a free radical mechanism, the first step of which is the extraction of a hydrogen atom from the alkyl radical on the silicon followed by an addition of the olefinic compound to the free radical thus generated. It should be understood, of course, that this invention is not limited to such a mechanism.

The temperature at which the reaction is carried out is not critical except that it should be sufficiently high that the free radical generator will initiate the formation of free radicals. This initiation temperature will vary depending upon the free radical generator employed and depending upon the reaction mixture employed. In general, the reaction temperature will take place above 100° C. although temperatures as low as 50° C. or below may be employed. In general, with the more reactive olefinic compounds, such as for example, acrylonitrile, temperatures of 50 to 75° C. are generally employed. This is to minimize the intrapolymerization of the olefin. If, with such reactive materials, the reaction temperature is too high most of the olefin will form an intra-polymer rather than grafting onto the organosilicon compound. On the other hand, with less reactive materials such as tetrafluoroethylene higher temperatures of the order of 110° C. to 150° C. may be desirable.

The concentration of the reactants in the method of this invention is not critical. Obviously, optimum yields will occur when the olefin is employed in amounts at least substantially equivalent to the number of alkyl groups in the organosilicon compound. The amount of peroxide catalyst is not critical although in general the amount of catalyst preferred is from .1 to 10% by weight based on the weight of the organosilicon compound.

This invention includes within its scope any organosilicon compound which has at least one alkyl radical of less than 5 carbon atoms, per molecule, and which organosilicon compound is substantially free of silicon bonded hydrogen and substantially free of radicals having C=C linkages. All such compounds are operative in this invention. It should be understood that the organosilicon compounds do not have to have one or more of the defined alkyl group attached to each silicon atom, but must have at least one such group per molecule. Thus, hexamethyldisiloxane, pentaphenylmethyldisiloxane and copolymers of diphenylsiloxane and dimethylsiloxane are all operative herein.

The term "substantially free" as employed herein means that the compound may contain traces of the undesirable ingredients which are normally present in commercially available organosilicon compounds. For example, organosilicon resins and polymers often contain traces of silicon bonded hydrogen as an impurity. These trace amounts do not interfere with this reaction.

The remaining valences of the silicon atom can be satisfied with any other known type of group. Specific examples of the types of compounds which are operative herein are organosilicon compounds of the formula

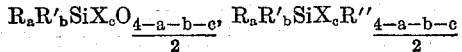

and $R_xR'_yX_zSi-$ (in which the Si is attached to another Si atom). In these compounds $a$ has a value from 1 to 4, $b$ has a value from 0 to 3, $c$ has a value from 0 to 3, $x$ has a value from 1 to 3, $y$ has a value from 0 to 2, and $z$ has a value from 0 to 2. R is an alkyl radical of less than 5 carbon atoms such as, for example, methyl, ethyl, propyl, isopropyl and butyl. R' is any organic radical attached to the silicon by a silicon-carbon bond, which radical is free of aliphatic unsaturation such as for example, higher alkyl radicals such as hexyl and octadecyl; cycloalkyl radicals such as cyclohexyl, and cyclopentyl; aryl hydrocarbon radicals such as phenyl, tolyl and xenyl; halogenated hydrocarbon radicals such as chlorocyclohexyl, chlorooctadecyl, pentafluoroethyl, heptafluoropropyl, chlorophenyl, bromophenyl, chloroxenyl, and trifluorotolyl; and organofunctional radicals such as carboxyphenyl, gamma-hydroxypropyl, gamma-aminopropyl, pentachlorophenoxymethyl [$C_6Cl_5OCH_2$—] and any other hydrocarbon radical having aldehyde, ketone, nitrile, nitro, carboxyl, amide, hydrosulphide or other functional groups attached thereto. R" is any divalent hydrocarbon radical which is free of aliphatic unsaturation such as methylene, ethylene, propylene, phenylene, xenylene or cyclohexylene. X is any hydrolyzable or condensable group such as hydroxyl, amino, sulphide, halogen, or OR''' groups where R''' is a monovalent hydrocarbon radical free of aliphatic unsaturation such as methyl, ethyl, octadecyl, cyclohexyl, phenyl, tolyl, benzyl and naphthyl.

Thus it can be seen that for the purpose of this invention the organosilicon compounds can be in the form of hydrolyzable silanes, such as dimethyldichlorosilane, ethyltriisopropoxysilane, butyltrichlorosilane, phenylmethyldiphenoxysilane; nonhydrolyzable silanes such as tetramethylsilane, dimethyldiphenylsilane, ethylphenyldicyclohexylsilane; partially hydrolyzed silanes containing residual hydrolyzable groups; silazanes such as dimethylsilazane, phenylmethylsilazane and dimethyltetramethyldisilazane; organosilicon sulphides; silcarbanes; polysilanes; silanols; salts of silanols and both completely condensed and partially condensed polysiloxanes.

Any monomeric substituted olefinic compound having at least one C=C linkage and any polymerized substituted olefin having substantial residual unsaturation of the class defined above (such as polymers of perfluorobutadiene, chloroprene, copolymers of butadiene and the like) is operative in the method of this invention. The term "substituted olefin" means that the molecule contains at least one of any atom other than carbon and hydrogen, for example oxygen, nitrogen, sulfur, halogen and phosphorus. Thus specific compounds which are operative are halogenated olefins such as tetrafluoroethylene, vinylchloride, allylchloride, trifluorochloroethylene, hexafluorobutadiene, vinylidene chloride, dichloroethylene and chlorocyclohexene; unsaturated aldehydes such as croton aldehyde, acrylic aldehyde and cinnamic aldehyde; unsaturated alcohols such as allyl alcohol, cyclohexenol, 4-methylpenten-3-ol-1, cinnamic alcohol and penten-4-ol-2, unsaturated acids such as acrylic acid, methacrylic acid, crotonic acid, vinylacetic acid, cinnamic acid, maleic acid and its equivalent maleic anhydride, dimethylmaleic acid, lauroleic acid, oleic acid, linoleic acid, and linolenic acid; unsaturated ethers such as diallyl ether, allylethyl ether; unsaturated esters such as methylacrylate, methylmethacrylate, vinylacetate and allylacetate; unsaturated amides such as crotonamide, acrylamide and cinnamamide; unsaturated nitriles such as acrylonitrile, methacrylonitrile and cinnamonitrile; unsaturated mercaptans such as allylmercaptan; unsaturated amines usch as allylamine, allylethylamine and vinyldimethylamine; unsaturated sulphides such as allyl sulphide and vinyl sulphide; unsaturated ketones such as methylvinyl ketone, allyl acetone, and benzalacetophenone; unsaturated isocyanates such as allyl isocyanate, cinnamyl isocyanate and compounds containing combinations of the above type functional groups.

It has been found that whereas any of the above olefinic compounds are operative in this invention the best yields are obtained with those which are free of active hydrogen, that is, hydrogen which is attached directly to oxygen, nitrogen or sulphur atoms.

Not only are the above monomeric olefins operative herein but also polymeric olefins having substantial C=C residual unsaturation. Thus, polychloroprene, copolymers of butadiene and acrylonitrile, polyhexafluorobutadiene and similar compounds can be employed in this invention. In general, it is preferred that these reactions be carried out in mutual solvents but this is not essential. It can be seen that this invention not only applies to the modification of organosilicon compounds and polymers but also to the modification of olefinic polymers. This invention is not operative with polymers of olefins having only one C=C bond, such as polytetrafluoroethylene, polytrifluorochloroethylene or polyvinylchloride, for such polymers do not retain a substantial amount of olefinic unsaturation.

The free radical generators which are operative in this invention include any organic peroxide and the specified azo compounds. Operative peroxides include any organic compound containing the O—O linkage. These compounds may be considered as derivatives of hydrogen peroxide in which one or both of the hydrogen atoms has been replaced by an organic radical. Thus, the peroxides of this invention can be any compound of the formula ROOH (which are generally known as hydroperoxides or as peroxy acids depending upon the nature of the R group) and any compound of the formula ROOR in which R is organic radical. These compounds are generally known as diorganoperoxides.

Specific examples of peroxides which are operative in this invention are hydroperoxides such as methyl hydroperoxide, t-butyl hydroperoxide, trans-decalin hydroperoxide, 1-methyl cyclopentyl hydroperoxide, 3-methyl-3-hydroperoxy-1-butyne, 2-cyclohexen-1-yl hydroperoxide, cumene hydroperoxide, tetralin hydroperoxide, triphenylmethyl hydroperoxide, benzyl hydroperoxide, p-nitrophenyldiphenylmethyl hydroperoxide, α-hydroperoxy tetrahydrofuran and α-hydroperoxyethyl ethylether; peroxy acids such as peroxyacetic acid, peroxyisovaleric acid, peroxycrotonic acid, peroxytrichloroacetic acid, peroxylactic acid, peroxybenzoic acid, monoperoxyphthalic acid, diperoxyphthalic acid, peroxycinnamic acid, p-methoxyperoxybenzoic acid, m-nitroperoxybenzoic acid and 2,4-dichloroperoxybenzoic acid; diorganoperoxides such as di-tertiary-butyl peroxide, diethyl peroxide, tertiary-butyl methyl peroxide, di-triphenylmethyl peroxide, ascaridole, 1,4-epydioxy-p-methane, 1,4,2,3-diepoxy-p-menthane, benzoyl peroxide, t-butylperbenzoate, benzoyl acetyl peroxide, monochlorobenzoyl peroxide, 2,4-dichlorobenzoyl peroxide, diacetyl peroxide, dialkyl peroxy dicarbonates of the formula ROOCOOCOOR in which R is methyl, ethyl, phenyl and tolyl; ethyl peroxyacetate, t-butyl peroxybenzoate, di-t-butyl diperoxyphthalate, bis(1-hydroxycyclohexyl)peroxide, 1-hydroxy-1'-hydroperoxycyclohexyl peroxide, bis-(hydroperoxycyclohexyl)peroxide, trimeric cyclohexanone peroxide, bis(hydroxyethyl)peroxide, bis(phenylhydroxymethyl)peroxide, trimeric acetone peroxide, methylhydroxymethyl peroxide and $(Me_3COO)_2CMe_2$.

The azo compounds which are operative in this invention are those containing tertiary carbon atoms (that is carbon atoms having no hydrogen attached thereto) attached to each nitrogen atom of the azo linkage. The remaining valences of the tertiary carbon are satisfied by nitrile radicals, carboxyalkyl radicals, cycloalkylene radicals, alkyl radicals and radicals of the formula YOOC— in which Y is an alkyl radical. Specific examples of such azo compounds are:

$Me_2(NC)CN=NC(CN)Me_2$
$MeEt(NC)CN=NC(CN)MeEt$
$Et_2(NC)CN=NC(CN)Et_2$

Pr₂(NC)CN=NC(CN)Pr₂
AmMe(NC)CN=NC(CN)MeAm
(HOOCCH₂CH₂)Me(NC)CN=
    NC(CN)Me(CH₂CH₂COOH)
(MeOOC)Me₂CN=NCMe₂(COOMe)
(EtOOC)Me₂CN=NCMe₂(COOEt)

and

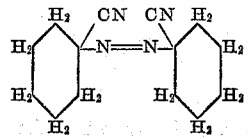

The last compound is an example of a cycloalkylene substituted tertiary carbon atom.

The reaction of this invention can be carried out either at subatmospheric, atmospheric or superatmospheric pressure. The latter is desirable when volatile reactants are employed. If desired, the reaction can be carried out in the presence of inert hydrocarbon solvents such as benzene, toluene, petroleum ether and the like.

The products of this invention are useful as lubricants, surfactants, hydraulic fluids, electrical insulating materials and for other uses in which organosilicon compounds are normally employed.

The following examples are illustrative only and should not be construed as limiting the invention which is properly delineated in the appended claims.

Example 1

In each of the runs shown in Table I below the organosilicon compound was mixed with benzoyl peroxide and chlorotrifluoroethylene in the amounts shown and heated in a rocker bomb at a temperature from 110 to 150° C. for 17 hours. At the end of this time the bomb was opened and the unreacted trifluorochloroethylene was collected and measured. The reaction products were then separated and tested as shown below.

Product 1 was a 2-phased material, one phase of which was fluid and the other a grease. Both the fluid and the grease contained trifluorochloroethylene grafted onto the methyl groups of the polysiloxane as shown by chlorine analysis and solvent fractionation studies. The fluid portion was tested on a Falex testing device and gave a tooth wear of 48 under a 770 lb. load. By contrast the original siloxane fluid was such a poor lubricant that it could not be tested under identical conditions.

The oil fraction from Run 1 had a viscosity of 2,000 cs. 325.7 g. of this material was dissolved in toluene. Acetone was then added to the solution until turbidity developed. The mixture was allowed to stand until the layers had separated and the insoluble layer was removed. This process was repeated a total of four times to give fractions 1 through 4 shown in Table II below. By the time fraction 4 had precipitated the amount of acetone added was equal to 88% by volume of the toluene originally added. Both the toluene and the acetone were then removed by distillation and the residue was fraction 5 shown below. Pure acetone was then added to fraction 5 and the mixture separated into an acetone insoluble material, fraction 5A, and an acetone soluble material, fraction 5B. The original siloxane was insoluble in acetone.

The properties of the various fractions are shown in Table II below.

TABLE II

| Fraction No. | Amt. in g. | $n_D^{25}$ | Viscosity in cs. at 25° C. | Percent by weight chlorine | Gel time at 250° C. | [1] Ratio Si to CF₂=CFCl |
|---|---|---|---|---|---|---|
| 1 | 30.3 | 1.4074 | 100,000 | 2.98 | | 14.5 |
| 2 | 51.2 | 1.4070 | 14,360 | | | |
| 3 | 26.7 | 1.4061 | 7,300 | 2.54 | | 17.3 |
| 4 | 13 | 1.4055 | 4,500 | | | |
| 5 | 198.1 | 1.4120 | 271 | | | |
| 5A | 96 | 1.4055 | 700 | 1.89 | 14 | 18 |
| 5B | 102.1 | 1.4109 | 185 | 5.40 | 22 | 8 |
| Starting siloxane | | 1.4035 | 1,000 | 0 | 6 | |

[1] The ratio of silicon to trifluoroethylene units was calculated from the chlorine content of the product.

The increase in gel time of fractions 5A and 5B over the starting siloxane is further proof that the material contains grafted trifluorochloroethylene units on the methyl groups and also shows the improved thermal stability of the compositions of this invention over methyl siloxanes.

Product 2 (from Table I supra) was a fluid having a viscosity of 11 cs. and containing 5.24% by weight chlorine.

Product 3 was a high polymeric viscous material which contained 3.67% chlorine.

Product 4 was fractionally distilled to obtain the fractions shown in Table III below.

TABLE I

| Run No. | Organosilicon Compound | Amount of Organosilicon Compound in g. | Amount of CF₂=CFCl in g. | Amount of benzoyl-peroxide in g. | Amt. CF₂=CFCl recovered in g. | Percent CF₂=CFCl reacted |
|---|---|---|---|---|---|---|
| 1 | 1,000 cs. fluid of the formula Me₃Si(OSi)ₓOSiMe₃Me₂. | 302 | 60.7 | 10 | 27.5 | 54.7 |
| 2 | 10 cs. fluid of the formula Me₃Si(OSi)ₓOSiMe₃Me₂. | 403 | 118 | 12 | 31 | 73.7 |
| 3 | Benzene soluble nonflowing dimethylpolysiloxane. | 100 | 100 | 3.5 | 75 | 25 |
| 4 | (Me₂SiO)₄ | 350.5 | 65 | 12 | 5 | 92.4 |
| 5 | (Me₃Si)₂O | 601.5 | 94 | 10 | 12.5 | 86.7 |
| 6 | A 320 cs. fluid of the formula (Me₂SiCH₂)ₓ. | 150 | 55 | 5 | 20 | 63.7 |

TABLE III

| Fraction No. | $n_D^{25}$ | Boiling Point, °C. | Pressure, mm. | Amount in g. | Percent Chlorine | Product |
|---|---|---|---|---|---|---|
| 1 | 1.3948 | 171 | 740 | 261 | | (Me$_2$SiO)$_4$. |
| 2 | 1.3951 | 81 | 25 | 7 | | Liquid. |
| 3 | 1.3978 | 90.2 | 25 | 2 | | Do. |
| 4 | 1.4006 | 95 | 25 | 8.5 | 9.25 | Do. |
| 5 | 1.4111 | 98–111 | 25 | 3 | | Liquid and solid. |
| Residue | 1.4280 | >121 | 25 | 57.5 | 23.7 | Liquid and grease. |
| Liquid portion of residue. | 1.4133 | | | 20 | 12.75 | Liquid. |

The liquid portion of the residue had a freezing point of below −79° C. as compared with +17° C. for the dimethylsiloxane cyclic tetramer.

Product 5. This product was fractionally distilled to give the fractions as shown in Table IV below.

TABLE IV

| Fraction No. | $n_D^{25}$ | Specific Refraction | Viscosity in cs. at 25° C. | Percent Chlorine | Boiling Point, °C. | Pressure | Amount |
|---|---|---|---|---|---|---|---|
| 1 | 1.3748 | .3014 | .65 | | 98.5 | 740 | (Me$_3$Si)$_2$O |
| 2 | 1.4036 | .2276 | 1.56 | 13.45 | 66–116 | 44 | 5.36 |
| 3[1] | 1.4190 | .1911 | 3.13 | 17.10 | 122–127 | 25 | 7.92 |
| 4[1] | 1.4230 | .1712 | 14.2 | 21.75 | 132 | 3 | 8.2 |
| 5[1] | 1.4193 | .1465 | 145 | 22.25 | 152–162 | 3 | 6.9 |
| 6[1] | 1.4274 | | 460 | | 153–191 | 3 | 8 |
| Residue | 1.4286 | | >460 | | >191 | 3 | 8 |

[1] Crystals separated from these fractions.

Product 6 was a fluid material having a viscosity of 261 cs. and a chlorine content of 2.76%. This material was fractionated with toluene and acetone as solvents in an identical manner as Product 1 to obtain fractions 1 to 4 shown in Table V below. The solvents were then removed and acetone was added. The acetone insoluble layer is fraction 5 and the acetone soluble layer is fraction 6.

TABLE V

| Fraction No. | Viscosity in cs. at 25° C. | Percent Chlorine |
|---|---|---|
| 1 | Too high to measure | |
| 2 | 988.5 | |
| 3 | 1734.6 | |
| 4 | 1313 | |
| 5 | 173 | 1.54 |
| 6 | 124.8 | 2.13 |

*Example 2*

304.5 g. of a trimethyl end-blocked dimethylpolysiloxane, 48.5 g. of vinyl acetate and 3 g. of benzoyl peroxide were heated at 120° C. for 3.5 hours. The product was an oily viscous material. It was dissolved in toluene and fractionated with acetone in the manner of Example 1, Run 1. Each of the four fractions thus obtained contained silicon. All solvent was then removed from the residue and pure acetone was added. The acetone insoluble fraction A and the acetone soluble fraction B had the properties shown below in Table VI.

TABLE VI

| Fraction | Amount | $n_D^{25}$ | Viscosity in cs. | Percent by wt. silicon | Percent by wt. methylsiloxane | Percent by wt. vinylacetate |
|---|---|---|---|---|---|---|
| A | 90 | 1.4066 | 5842 | 35.2 | 93 | 7 |
| B | 16.6 | grease | | 23.4 | 61.75 | 38.25 |

*Example 3*

157 g. of the siloxane of Example 2, 52.2 g. of acrylonitrile and 3 g. benzoyl peroxide were mixed and heated under nitrogen at 65 to 75° C. for 3 hours. The resulting product was a viscous mass. The product was extracted with 105 g. of benzene and the solvent was then removed, leaving a residue. This was then dissolved in toluene to give a 10% by weight solution and the solution was fractionated with acetone as shown in Example 1, whereupon 5 fractions were obtained in the amounts shown below in Table VII. The solvent was then removed and the pure acetone was added to the residue. This gave an acetone insoluble material, fraction 6, and an acetone soluble material, fraction 7.

TABLE VII

| Fraction No.: | Amount |
|---|---|
| 1 | 55.3 |
| 2 | 6.5 |
| 3 | 4.9 |
| 4 | 3.2 |
| 5 | .8 |
| 6 | 8.0 |
| 7 | 18.5 |

All fractions contained silicon.

*Example 4*

75 g. of a benzene soluble nonflowing dimethylpolysiloxane, 25 g. of acrylonitrile and 2 g. of benzoyl peroxide were dissolved in toluene and heated under nitrogen for 3 hours at 100° C. The solvent was removed to give a solid plastic yellow material which was analyzed and found to contain 30.83% silicon. The material was dissolved in toluene and acetone was added thereto portionwise to obtain the 3 fractions shown in Table VIII.

TABLE VIII

| Fraction No. | Percent Silicon | Percent Dimethyl siloxane | Percent Acrylonitrile |
|---|---|---|---|
| 1 | 29.95 | 79 | 21.0 |
| 2 | 37.35 | 98.7 | 1.3 |
| 3 | 37.55 | 99.2 | .8 |

*Example 5*

150 g. of the siloxane of Example 2, 50 g. of acrylamide, and 4 g. benzoyl peroxide were heated up to 55° C. Polymerization started and the reaction was exothermic. A solid mass resulted which was extracted with toluene. 80 g. of a toluene insoluble material was obtained which contained silicon. The toluene soluble product was a fluid which was centrifuged and separated into 21 g. of a grease and 99 g. of a fluid. Both of these contained silicon.

Example 6

200 g. of the siloxane of Example 2, 82.5 g. of cis-dichloroethylene and 10 g. of benzoyl peroxide were dissolved in 50 cc. of toluene and heated under nitrogen for 3 hours at temperatures ranging from 25 to 85° C. After removal of the solvent, the product was a mixture of a fluid and a grease. The grease contained silicon. The fluid had a $n_D^{25}$ of 1.4098, a viscosity at 25° C. of 752.7 cs., a $d_4^{25}$ of .987 and contained 1.87% chlorine. This fluid also contained silicon. Upon standing crystals separated from the fluid which crystals contained both silicon and chlorine.

Example 7

306.5 g. of the siloxane of Example 2, 52 g. of hexafluorodichlorocyclopentene and 3 g. of benzoyl peroxide were mixed and heated under nitrogen at 110° C. for 2.5 hours. There was obtained a clear viscous fluid which had a cyclopentene grafted onto the siloxane.

Example 8

Experiment of Example 6 was repeated employing allyl alcohol, allyl amine and acrylic acid in lieu of acrylamide. In each of these 3 runs the olefin was grafted onto the siloxane. The reaction product of acrylic acid and the siloxane was a good emulsifying agent.

Example 9

347 g. of dimethyldiethoxysilane, 77 g. of $CF_2=CFCl$ and 3 g. of benzoyl peroxide were heated in an autoclave 24 hours at 90 to 110° C. The resulting product was a liquid which upon hydrolysis gave a fluid polysiloxane containing chlorine, thus indicating that the olefin had grafted onto the methyl groups of the siloxane.

The reaction product was quite resistant to hydrolysis and after separating the siloxane fraction from the non-silicone hydrolysis fraction it was found that the latter also contained chlorine, indicating that the olefin had also grafted onto the ethoxy groups. The hydrolysis of the reaction product required more drastic conditions than the hydrolysis of dimethyldiethoxy silane. This shows that the grafting of the olefin onto the ethoxy silane stabilized the ester against hydrolysis.

Example 10

When diethyldichlorosilane is reacted with trifluorochloroethylene in the manner of Example 1, addition of the olefin to the ethyl groups on the ethylchlorosilane takes place. Equivalent results are obtained when a toluene solution of a resinous phenylmethylpolysilane is employed in the method of Example 1 and when tetramethylsilane is employed therein.

Example 11

210 g. of trifluorochloroethylene, 360 g. of a 1,000 cs. trimethyl end-blocked dimethylpolysiloxane, 5 g. of di-t-butyl peroxide and 2 g. of MgO were heated in an atmosphere of nitrogen in an autoclave at a temperature of 131° C. for about 17 hours. The reaction product was a gel containing 29% grafted trifluorochloroethylene. This product was separated by extraction with toluene and there was obtained a soluble fluid containing 27% by weight grafted trifluorochloroethylene.

Example 12

408 g. of the siloxane of Example 11, 189 g. of trifluorochloroethylene, 5 g. of t-butyl hydroperoxide and 2 g. of MgO were heated under nitrogen in an autoclave at 139° C. for 16.5 hours. The product was a grease-like material which was found to contain 24.2% by weight grafted trifluorochloroethylene.

Example 13

334 g. of the siloxane of Example 11, 192 g. of trifluorochloroethylene, 6.5 g. of dilauroyl peroxide and 2 g. of MgO were heated in an autoclave 17 hours at 111° C. After removing the unreacted materials 410 g. of an oily product containing 13.4 percent by weight grafted trifluorochloroethylene was obtained.

Example 14

307 g. of the siloxane of Example 11, 5 g. of succinic acid peroxide, 219 g. of trifluorochloroethylene and 2 g. of MgO were heated 18.5 hours at 112° C. in an autoclave. The resulting product was centrifuged and there was obtained 322 g. of an oil containing 10.5% by weight grafted trifluorochloroethylene.

Example 15

374 g. of the siloxane of Example 11, 170 g. of trifluorochloroethylene, 4 g. of perbenzoic acid and 2 g. of MgO were heated in an autoclave 16 hours at 97° C. The product was 361 g. of an oil containing 7.2 percent by weight grafted trifluorochloroethylene.

Example 16

313 g. of the siloxane of Example 11, 200 g. of trifluorochloroethylene, 7 g. of cumene hydroperoxide and 2 g. of MgO were heated in an autoclave 17 hours at 113° C. The product amounted to 309 g. of an oil containing 2.4% by weight grafted chlorotrifluoroethylene.

Example 17

304 g. of the siloxane of Example 11, 178 g. of trifluorochloroethylene, 5 g. of azo - bis - di - isobutyrolnitrile,

were heated in an autoclave 15.5 hours at 110° C. The resulting product amounted to 328 g. of an oil containing grafted chlorotrifluoroethylene.

Example 18

Results equivalent to those of Example 17 are obtained when the following azo compounds are employed in the method of that example.

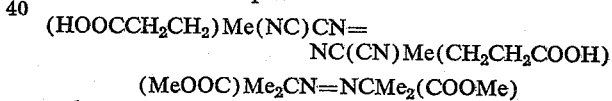

and

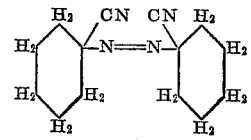

That which is claimed is:

1. A graft copolymer which is the reaction product formed by the process which comprises heating a mixture of (1) an organopolysiloxane consisting essentially of diorganosiloxane units in which the organic radicals are selected from the group consisting of alkyl radicals of less than 5 carbon atoms and phenyl radicals, there being at least one of said alkyl radicals per molecule and said organopolysiloxane being essentially free of silicon-bonded hydrogen and essentially free of organic radicals having aliphatic unsaturation therein, (2) a halogenated olefin, and (3) a free radical generator of the group consisting of organic peroxides and azo compounds in which both the N atoms of the azo linkage are attached to a tertiary carbon atom and the remaining valences of said tertiary carbon atoms are satisfied by radicals of the group consisting of nitrile radicals, carboxyalkyl radicals, cycloalkylene radicals, alkyl radicals and radicals of the formula YOOC— in which Y is an alkyl radical, at a temperature above that at which the free radical generator forms free radicals.

2. A graft copolymer which is the reaction product formed by heating a mixture of an organopolysiloxane consisting essentially of dimethylsiloxane units, said organopolysiloxane being essentially free of silicon bonded hydrogen and essentially free of organic radicals having aliphatic unsaturation therein, the compound $CF_2=CFCl$, and a free radical generator of the group consisting of organic peroxides and azo compounds in which both the N atoms of the azo linkage are attached to a tertiary carbon atom and the remaining valences of said tertiary carbon atoms are satisfied by radicals of the group consisting of nitrile radicals, carboxyalkyl radicals, cycloalkylene radicals, alkyl radicals and radicals of the formula YOOC— in which Y is an alkyl radical, at a temperature above that at which the free radical generator forms free radicals.

References Cited in the file of this patent

UNITED STATES PATENTS

| | | |
|---|---|---|
| 2,407,181 | Scott | Sept. 3, 1946 |
| 2,423,497 | Harmon | July 8, 1947 |
| 2,570,462 | Lipscomb | Oct. 9, 1947 |
| 2,716,128 | West | Aug. 23, 1955 |

UNITED STATES PATENT OFFICE
CERTIFICATE OF CORRECTION

Patent No. 2,958,707  November 1, 1960

Earl L. Warrick

It is hereby certified that error appears in the printed specification of the above numbered patent requiring correction and that the said Letters Patent should read as corrected below.

Columns 5 and 6, TABLE I, opposite Run Nos. 1 and 2, the formula, each occurrence, should appear as shown below instead of as in the patent:

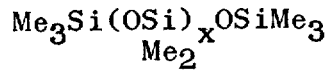

Signed and sealed this 25th day of April 1961.

(SEAL)
Attest:

ERNEST W. SWIDER
Attesting Officer

DAVID L. LADD
Commissioner of Patents